United States Patent
Lei et al.

(10) Patent No.: US 10,251,088 B2
(45) Date of Patent: Apr. 2, 2019

(54) FACILITATING LOAD BALANCING IN WIRELESS HETEROGENEOUS NETWORKS

(71) Applicants: AT&T Intellectual Property I, L.P., Atlanta, GA (US); AT&T Mobility II LLC, Atlanta, GA (US)

(72) Inventors: Hongyan Lei, Plano, TX (US); Ye Chen, Milton, GA (US); Zhi Cui, Sugar Hill, GA (US); Cheng P. Liu, Johns Creek, GA (US); Slawomir Stawiarski, Carpentersville, IL (US); Yonghui Tong, Alpharetta, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 257 days.

(21) Appl. No.: 14/682,221

(22) Filed: Apr. 9, 2015

(65) Prior Publication Data
US 2016/0302106 A1  Oct. 13, 2016

(51) Int. Cl.
*H04W 28/08* (2009.01)
*H04W 36/32* (2009.01)
(Continued)

(52) U.S. Cl.
CPC ....... *H04W 28/08* (2013.01); *H04W 28/0226* (2013.01); *H04W 36/32* (2013.01);
(Continued)

(58) Field of Classification Search
CPC . H04W 16/32; H04W 28/0226; H04W 28/08; H04W 36/04; H04W 36/22; H04W 36/32; H04L 2012/5678; H04L 47/125
(Continued)

(56) References Cited

U.S. PATENT DOCUMENTS 6,256,500 B1 * 7/2001 Yamashita ............ H04W 36/04
455/437
8,169,933 B2   5/2012 Srinivasan et al.
(Continued)

FOREIGN PATENT DOCUMENTS

EP    2728926 A1   5/2014
EP    2816832 A1   12/2014
(Continued)

OTHER PUBLICATIONS

3GPP, "LTE•Evolved UniversalTerrestrial'Radio Access (E-UTRA); Radio Resource Control (RRC); Protocol specification (3GPP TS 36.331version 10.5.0 Release 10)", Mar. 2012, ETSI, ETSI TS 136 331 V10.5.0, pp. 53-58.*
(Continued)

*Primary Examiner* — Un C Cho
*Assistant Examiner* — Shah M Rahman
(74) *Attorney, Agent, or Firm* — Amin, Turocy & Watson, LLP

(57) ABSTRACT

Load balancing is facilitated utilizing geographical location and mobility speed. An example method includes receiving, by a first cell device including a processor and associated with a first cell, from a device of devices, information indicative of whether the device has detected cell type information from a second cell device associated with a second cell, wherein at least a portion of the second cell is located within a first boundary of the first cell. The method also includes: determining, by the first cell device, a mobility characteristic of the device, wherein the devices comprise respective mobility characteristics; and selecting, by the first cell device, the device of the devices to associate with the second cell based on the mobility characteristic of the device.

20 Claims, 10 Drawing Sheets

(51) Int. Cl.
*H04W 28/02* (2009.01)
*H04W 16/32* (2009.01)
*H04L 12/803* (2013.01)
*H04W 36/22* (2009.01)
*H04W 36/04* (2009.01)

(52) U.S. Cl.
CPC .......... *H04L 47/125* (2013.01); *H04W 16/32* (2013.01); *H04W 36/04* (2013.01); *H04W 36/22* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 8,355,727 | B2* | 1/2013 | Hoang | H04W 36/0055 370/328 |
| 8,761,021 | B2 | 6/2014 | Ray et al. | |
| 2008/0132239 | A1* | 6/2008 | Khetawat | H04W 36/12 455/438 |
| 2010/0085884 | A1* | 4/2010 | Srinivasan | H04W 16/08 370/252 |
| 2010/0113035 | A1 | 5/2010 | Eskicioglu et al. | |
| 2010/0128708 | A1* | 5/2010 | Liu | H04W 36/0022 370/338 |
| 2011/0039560 | A1 | 2/2011 | Hratko et al. | |
| 2011/0250891 | A1* | 10/2011 | Zou | H04W 36/04 455/437 |
| 2012/0028629 | A1* | 2/2012 | Liu | H04W 52/325 455/422.1 |
| 2012/0188884 | A1* | 7/2012 | Simonsson | H04W 36/0083 370/252 |
| 2013/0005344 | A1* | 1/2013 | Dimou | H04W 36/0083 455/441 |
| 2013/0231115 | A1* | 9/2013 | Lin | H04W 36/0083 455/436 |
| 2013/0273921 | A1* | 10/2013 | Kenington | H04W 16/18 455/446 |
| 2014/0018076 | A1* | 1/2014 | Zhou | H04W 48/04 455/436 |
| 2014/0036868 | A1 | 2/2014 | Guo et al. | |
| 2014/0045505 | A1* | 2/2014 | Henry | H04W 36/0061 455/444 |
| 2014/0148174 | A1 | 5/2014 | Teyeb et al. | |
| 2014/0155081 | A1 | 6/2014 | Nuss et al. | |
| 2014/0171088 | A1 | 6/2014 | Edara et al. | |
| 2014/0220973 | A1 | 8/2014 | Lunden et al. | |
| 2014/0242960 | A1 | 8/2014 | Cai et al. | |
| 2014/0269464 | A1 | 9/2014 | Park et al. | |
| 2014/0274101 | A1 | 9/2014 | Venkatesan | |
| 2014/0341076 | A1* | 11/2014 | Orlandi | H04W 48/18 370/254 |
| 2014/0355428 | A1* | 12/2014 | Smith | H04W 48/06 370/230 |
| 2015/0133141 | A1* | 5/2015 | Song | H04W 72/0406 455/452.2 |
| 2015/0189533 | A1* | 7/2015 | Fehske | H04W 16/18 370/229 |
| 2015/0215830 | A1* | 7/2015 | Dalsgaard | H04W 36/0094 455/444 |
| 2015/0281886 | A1* | 10/2015 | Steiner | H04W 4/021 455/456.1 |
| 2015/0288562 | A1* | 10/2015 | Nammi | H04W 24/02 370/254 |
| 2016/0066238 | A1* | 3/2016 | Zhang | G01S 5/0252 370/332 |

FOREIGN PATENT DOCUMENTS

| | | | |
|---|---|---|---|
| WO | 2013140243 | A1 | 9/2013 |
| WO | 2014089051 | A1 | 6/2014 |
| WO | WO 2014179938 | A1 * | 11/2014 .......... G01S 5/0252 |

OTHER PUBLICATIONS

3GPP, "TS 36.331 version 10.14.0 LTE; Evolved Universal Terrestrial Radio Access (E-UTRA); Radio Resource Control (RRC); Protocol specification", Sep. 2014, ETSI, ETSI TS 136 331 V10.14.0, pp. 142, 143 and 214.*

LG Electronics, "R2-122896: How to reduce state3 handover failure rate in macro-to-pico handover, "May 2012, 3GPP, 3GPP TSG-RAN WG2 #78, pp. 1-2.*

Leontiadis, et al., "From Cells to Streets: Estimating Mobile Paths with Cellular-Side Data," Proceedings of the 10th ACM International on Conference on emerging Networking Experiments and Technologies, 2014, pp. 121-132, ACM. Retrieved on Jan. 25, 2015.

Min, et al., "Scheduling and Positioning for the Expanded Region of an Indoor Cell in Heterogeneous Networks," International Conference on Indoor Positioning and Indoor Navigation, Oct. 2014, 8 pages. Retrieved on Jan. 25, 2015.

Piri, et al., "Scaling Network Information Services to Support HetNets and Dynamic Spectrum Access," Journal of Communications and Networks, 2014, pp. 202-208, vol. 16, No. 2. Retrieved on Jan. 25, 2015.

Alviola, "Energy Efficiency in Wireless Networks," Sep. 2013, 166 pages. Retrieved on Jan. 25, 2015.

Coletti, "Heterogeneous Deployment Analysis for Cost-Effective Mobile Network Evolution," Sep. 2012, 229 pages, Denmark. Retrieved on Jan. 25, 2015.

* cited by examiner

FACILITATING LOAD BALANCING IN WIRELESS HETEROGENEOUS NETWORKS

TECHNICAL FIELD

The subject disclosure relates generally to wireless networks, and specifically to facilitating load balancing in wireless heterogeneous networks.

BACKGROUND

Mobile device traffic has grown exponentially and the trend is for continued growth at the same or greater rates. To meet the mobile traffic growth demand and improve the end user experience, mobile service providers are actively looking for mechanisms to improve system capacity and end user experience. Deploying small cells (e.g., metro cells, pico cells) can help to improve coverage and capacity. Small cells can be employed to help offload macro cell traffic to increase spectrum efficiency and/or improve network performance.

DETAILED DESCRIPTION

Figure 1:
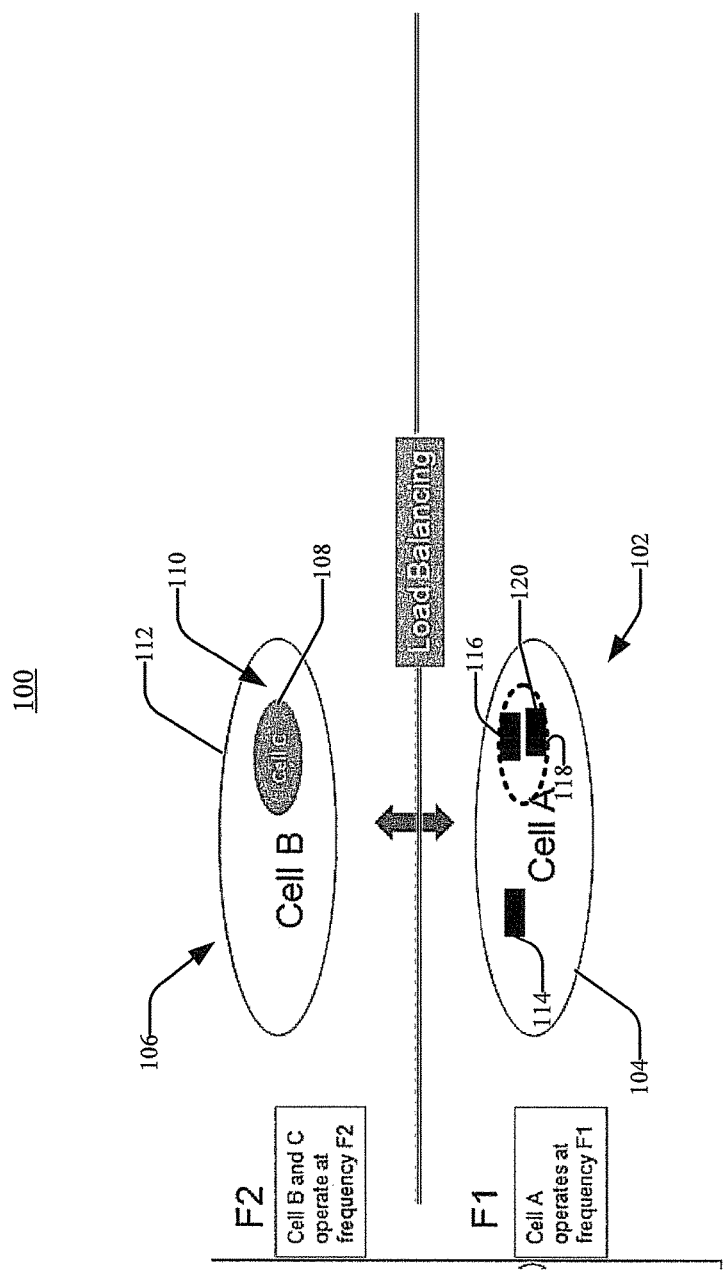
FIGS. 1 and 2 illustrate example schematic diagrams of systems facilitating load balancing in wireless heterogeneous networks in accordance with embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as method, system, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS), femto cell device," "Node B (NB)," "evolved Node B (eNode B)," "home Node B (HNB)," "metro cell device," "micro cell" and "macro cell device" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows. Further, the terms "femto" and "femto cell", the terms "macro" and "macro cell," and the terms "micro" and "micro cell" are used interchangeably.

Furthermore, the terms "mobile device," "subscriber," "customer," "consumer," "end user" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be used in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies.

Mobile device traffic has grown exponentially and the trend is for continued growth at the same or greater rates. To meet the mobile traffic growth demand and improve the end user experience, mobile service providers are actively looking for mechanisms to improve system capacity and end user experience. Deploying small cells (e.g., metro cells, pico cells) can help to improve coverage and capacity. Small cells can be employed to help offload macro cell traffic to increase spectrum efficiency and/or improve network performance. When a macro cell device experiences high traffic load and needs to offload the traffic, the macro cell device can assign the traffic to another macro cell device or to one or more small cell devices. However, in conventional systems, when the macro cell device selects mobile devices to offload, the macro cell device is not aware of the coverage area of the small cell. The mobile devices selected to be re-assigned from the macro cell device can be randomly and/or uniformly distributed within the coverage area of the macro cell device. Load balancing without the benefit of such information about the small cells can result in undesired scenarios in which the macro cell device offloads to another macro cell thereby causing the recipient macro cell to become overloaded while the small cell is underutilized.

One or more embodiments can reduce the likelihood of overload on a macro cell device and/or improve small cell device utilization by performing load balancing based on geographical location of small cells and mobile devices and, in some cases, based on the speed of movement of the mobile devices. In some embodiments, the benefits of small cell device offloading can be realized and overall heterogeneous network performance can be improved. The end user experience can also be improved since mobile devices that are offloaded to small cell devices can receive various resources and experience higher throughput. One or more embodiments can prevent high speed mobile devices from being offloaded to small cells and thereby experiencing reduced performance due to repeated handover and the unnecessary use of scheduling resources.

Figure 2:
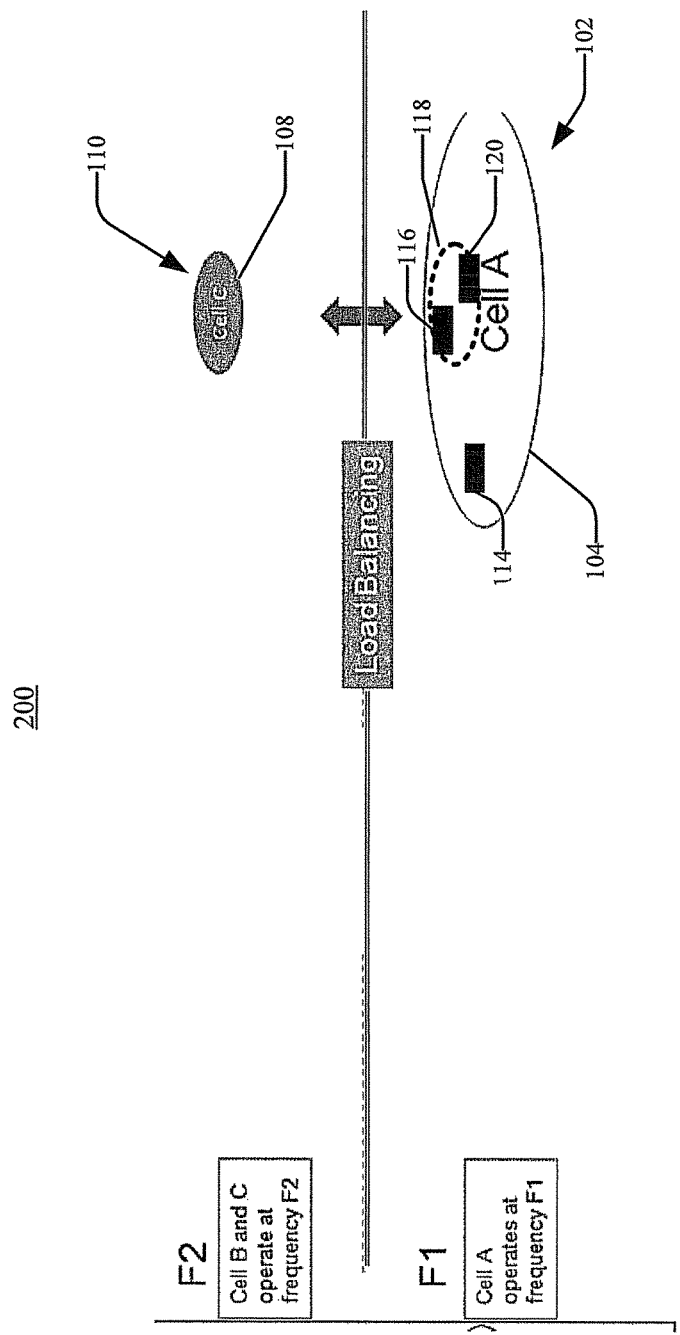

Turning now to the drawings, FIGS. 1 and 2 illustrate example schematic diagrams of systems facilitating load balancing in wireless heterogeneous networks in accordance with embodiments described herein. Two embodiments of load balancing systems, methods and/or apparatus are described with reference to FIGS. 1 and 2. In FIG. 1, a heterogeneous network having two macro cells and a small cell co-channel with one of the macro cells is shown and described. In FIG. 2, a heterogeneous network having a macro cell and a small cell is shown and described.

Turning first to FIG. 1, system 100 includes cell devices 102, 106, which are configured to operate on carriers at a first frequency and a second frequency, F1 and F2, respectively. As shown, cell devices 102, 106 have respective coverage areas 104, 112 that are geographically aligned to be substantially overlapping with one another. While the coverage areas 104, 112 are geographically overlapping with one another in the embodiments shown, the coverage areas 104, 112 need not geographically overlap and all such variations of relative locations of the coverage areas 104, 112 are envisaged. In some embodiments, cell device 106 can include one or more of the structure and/or functionality of cell device 102.

In some embodiments, cell devices 102, 106 can be macro cell devices. In other cases, cell devices 102, 106 can be cell devices for any number of different types of cells. For example, cell devices 102, 106 can be cell devices for any number of different types of cells that have coverage areas that are larger than those of the small cell device 110.

System 100 also includes a small cell device 110 configured to operate on a carrier at the second frequency, F2 and having coverage area 108. As such, small cell device 110 is co-channel with cell device 106 in this embodiment. Coverage area 108 is full encompassed by coverage area 112 in the embodiment shown. In other embodiments at least one portion of coverage area 108 is overlapping and encompassed by coverage area 112. In various embodiments, the size of coverage area 108 is less than the size of each of coverage areas 104, 108. Small cell device 110 can be located at a region of high mobile device traffic. In some embodiments, small cell device 110 can be a hot spot cell device servicing a high traffic area. While the embodiment shown depicts one small cell device, the embodiments are extensible to cases in which numerous small cell devices have coverage areas that at least partially overlap with coverage area 112 of cell device 106.

When the cell device 102, which operates at carrier F1, is overloaded with traffic from mobile devices 114, 116, 118 (or has a defined amount of traffic or has traffic growing in a pattern that indicates the cell device 102 will become overloaded), cell device 102 can offload the traffic from one or more of mobile devices 114, 116, 118 to another carrier (e.g., carrier F2 of FIG. 1). In one embodiment, cell device 102 can select either cell device 106 or small cell device 110 to which to offload traffic from one or more of mobile devices 114, 116, 118. However, in embodiments in which the cell device 102 does not know the geographical location of small cell device 110, cell device 102 may randomly or uniformly select any one or each of mobile devices 114, 116, 118 geographically located within coverage area 104 to assign to cell device 106 since cell device 106 is a cell device associated with a coverage area larger than that of the small cell device 110. If the traffic is offloaded to cell device 106, at the carrier F2 layer, cell device 106 can have a resultant high mobile device traffic load while the small cell device 110 can remain underutilized. Further, when the cell device 106 has a high traffic load, the resources provided to each of the mobile devices serviced by the cell device 106, and the corresponding experience for the end user associated with the mobile device, can be less than optimal. As such, if one or more of the mobile devices 114, 116, 118 can be assigned by cell device 102 to the small cell device 110, which may have a lower utilization than cell device 106 (instead of only being assigned to the cell device 106), the re-assigned mobile devices can experience higher throughput and the user associated with the re-assigned mobile devices can have a better experience.

In one embodiment, the cell device 102 can perform cell load balancing by selecting which of mobile devices 114, 116, 118 to assign to the small cell device 110 based on the geographical location of the small cell device 110 and the geographical locations of mobile devices 114, 116, 118. The cell device 102 can be configured to prioritize mobile devices that are geographically located within an area of coverage area 104 that overlaps with the geographical area of coverage area 108. For example, in FIG. 1, mobile devices 116, 118 are located within area 120, which indicates the overlap of coverage area 104 with coverage area 108.

In this embodiment, load balancing is performed based on the cell device 102 determining the location of the small cell device coverage area 108 and identifying mobile devices within an area 120 corresponding to the coverage area 108. For example, the load balancing can be performed by the cell device 102 determining that the mobile devices 116, 118 are within area 120 while mobile device 114 is outside of area 120 and assigning a higher priority to mobile devices 116, 118 than to mobile device 114 for re-assignment to small cell device 110 should offloading be performed. Cell device 102 can prefer re-assignment of mobile devices 116, 118 for re-assignment to small cell device 110.

In other embodiments, cell device 102 need not assign priority to mobile devices 114, 116, 118. Instead, cell device 102 can re-assign mobile devices 116, 118 to small cell device 110 based on determining that the mobile devices 116, 118 are located within area 120 and area 120 corresponds to the geographic location of coverage area 108.

In either embodiment, in general, the cell device 102 can give preference to mobile devices within coverage area 104 that are geographically located within an area corresponding to that of the geographical location of the small cell device 110 coverage area 108 to increase utilization of the small cell device 110 and/or improve overall network resource utilization and/or performance (e.g., cell edge throughput, average throughput, peak throughput).

In some embodiments, the cell device 102 can receive information indicative of the geographical location of, and/or determine the geographical location of, the small cell device 110. For example, the cell device 102 can receive and/or determine information indicative of the latitude/longitude information for the small cell device 110. The latitude/longitude information can be received and/or determined via direct message between the small cell device 110 and the cell device 102 and/or based on information transmitted through the backend centralized system. For example, the information can be transmitted as an X2 message, or obtained via operating support systems (OSS) queries or the like.

In some embodiments, the cell device 102 can determine or estimate the coverage area 108 of the small cell device 110 based on profile information for the small cell device 110. For example, the cell device 102 can receive information indicative of and/or determine profile information including, but not limited to, transmit power, capacity or the like. The profile information can be provided to or obtained by the cell device 102 via X2 messages and/or OSS queries. In some embodiments, the cell device 102 can determine the radius of the small cell device coverage area 108 based on the small cell transmit power.

The cell device 102 can employ geofencing or cell type reporting to facilitate determination of location of the mobile devices 114, 116, 118 and/or offloading. For example, with reference to geofencing, the cell device 102 can receive and/or determine information indicative of the mobile devices located within the coverage area 104 of cell device 102. In the example shown in FIG. 1, the cell device 102 can receive and/or determine information indicative of mobile devices 114, 116, 118 being located in coverage area 104. The cell device 102 can also receive and/or determine information indicative of which of the mobile devices in coverage area 104 are located within area 120, which corresponds to the coverage area 108 of the small cell device 110. By way of example, but not limitation, cell device 102 can receive and/or determine information indicative of the presence of mobile devices 116, 118 being located within area 120 through any number of approaches in which the cell device 102 performs anonymous location tracking that does not target any specific mobile devices.

After or upon a mobile device entering the coverage area 104 for the cell device 102, the cell device 102 can transmit information to the mobile device providing the mobile device with information identifying the geographical location and/or size of the coverage area 108 for the small cell device 110. The cell device 102 can provide this information to the mobile device in any number of ways including, but not limited to, a radio resource control (RRC) reconfiguration message. The cell device 102 can transmit the information identifying the geographical location and/or size of the coverage area 108 and/or presence of the small cell device 110 upon initial detection of the mobile device, at one or more periods of time while the mobile device is located within the coverage area 104 and/or based on a defined condition occurring (e.g., cell device 102 determination that load balancing will be performed by the cell device 102). In various embodiments, the cell device 102 need not know the specific identity of the small cell; rather, the cell device 102 may know information indicating the location of the small cell.

When the mobile device enters and/or exits the geographical location coinciding with the coverage area 108 (e.g., when the mobile device enters and/or exits the area 120), the mobile device can transmit a notification to the cell device 102 informing the cell device 102 that the mobile device has entered and/or exited the geographical location coinciding with the coverage area 108. In some embodiments, the mobile device sends a notification to the cell device 102 only upon entering the area coinciding with the coverage area 108. In some embodiments, the mobile device sends a notification to the cell device only upon exiting the area coinciding with the coverage area 108.

When the mobile device notifies the cell device 102 with information indicating the mobile device is located within the area 120, the cell device 102 can include the mobile device in a list identifying all mobile devices within the area 120. When performing load balancing, the cell device 102 can prefer for re-assignment to the small cell device 110, or prioritize higher for re-assignment to the small cell device 110, those mobile devices located within area 120, which coincides with coverage area 108.

In this embodiment, the mobile device can use a radio access network identifier (RAN ID) together with the notification to the cell device 102 (in lieu of using the user identity associated with the mobile device) to improve protection of end user privacy.

As another example, in some embodiments, in lieu of using geofencing, the cell device 102 can utilize cell type reporting for facilitating load balancing. Specifically, cell type reporting can be utilized for facilitating determination of the presence of the small cell device 110. For example, the small cell device 110 can broadcast cell type identification information for the small cell device 110 (for example, via physical cell identity (PCI) range partition, or other mechanisms). The mobile device can detect the broadcast from the small cell device 110 and can report to the cell device 102 that the mobile device has detected the presence or proximity of the small cell device 110. The cell device 102 can then place the mobile device in a list of mobile devices that are preferred for offloading to the small cell device 110 should load balancing be performed by the cell device 102. In some embodiments, the cell device 102 may not place the mobile device on a list but, rather, may associate information with a record about the mobile device that indicates the mobile device has priority or is preferred for offloading should the cell device 102 perform load balancing.

In this embodiment, the mobile device can notify the cell device 102 when the mobile device can no longer detect the broadcast of the cell type identification information by the small cell device 110. As such, the cell device 102 can update the list or set of mobile devices that are prioritized or preferred for offloading from time to time.

As such, whether by geolocation or cell type reporting, in addition to other factors employed in identifying mobile devices for offloading, the embodiments described herein can also utilize geographical location of the mobile devices and the small cell device 110 to prioritize mobile devices for offloading.

In some embodiments, in addition to utilization of geographical location information for a small cell device 110, and mobile devices, the cell device 102 can utilize one or more mobility characteristics of the mobile devices to determine whether to prioritize a mobile device for offloading or whether to exclude a mobile device for offloading. For example, in one embodiment, the cell device 102 tracks and/or determines one or more mobility characteristics of one or more mobile devices in the coverage area 104. For example, the cell device 102 can track and/or determine one or more mobility characteristics of mobile devices 114, 116, 118. In some embodiments, a mobility characteristic can be the speed of movement of the mobile device. For example, in 3GPP, an enhancement is provided that can enable speed estimation of a mobile device by a macro cell eNB (e.g., cell device 102). Alternatively, a mobile device (e.g., mobile device 114, 116, 118) can estimate the mobility speed of itself and report the mobility speed to the macro cell eNB (e.g., cell device 102). Although the enhancement is described with reference to 3GPP systems, in other embodiments, the geographical location and/or mobility characteristics (e.g., mobility speed aware considerations) can be extended to other technologies including, but not limited to, Wi-Fi and 5G technologies.

When performing load balancing, the cell device 102 can prefer for re-assignment to the small cell device 110, or prioritize higher for re-assignment to the small cell device 110, those mobile devices moving at a speed that is lower than a defined value. Alternatively, the cell device 102 can exclude as a candidate for re-assignment to the small cell device 110, or prioritize lower for re-assignment to the small cell device 110, those mobile devices moving at a speed that is higher than a defined value.

Since the small cell device 110 is associated with a small coverage area 108, re-assignment to the small cell device 110 of a mobile device moving at a high speed is likely to require re-assignment shortly after the initial re-assignment since the mobile device moving at a high speed is likely to be soon outside of the coverage area 108 notwithstanding the mobile device may be located within area 120 at the time of initial re-assignment by the cell device 102 during load balancing.

As such, in some embodiments, the cell device 102 can maintain mobile devices having a speed of movement greater than a defined value within coverage area 104 and serviced by the cell device 102 (in lieu of re-assignment to and servicing by the small cell device 110).

In the embodiments described, the cell device 102 can re-assign more mobile devices to the coverage area 108 of the small cell device 110 to increase the utilization of the small cell device 110 and increase the likelihood of improving the overall heterogeneous network performance of systems 100 and 200. The mobile devices that are moving at a high speed can be maintained for servicing by cell device 102 instead of being offloaded to the small cell device 110 to avoid or reduce the likelihood that the mobile device will have immediate handover to another cell after the cell device 102 performs the offloading (notwithstanding that mobile device may be located in the area 120, which overlaps with coverage area 108 of the small cell device 110).

In some embodiments, if the cell device 102 selected a mobile device having a high speed for re-assignment to the small cell device 110, this mobile device is likely to handover to small cell device 110 first, then immediately follow with another handover to cell device 106. This frequent handover may not be desired and can impact the performance of the mobile device. As such, if the cell device 102 knows that the high speed mobile device will be offloaded to the small cell device 110, the cell device 102 can keep this high speed mobile device at the cell device 102 and not offload the high speed mobile device during that instance of offloading/load balancing.

FIG. 2 illustrates another example schematic diagram of a system facilitating load balancing in a wireless heterogeneous network in accordance with embodiments described herein. In FIG. 1, a heterogeneous network having two macro cells and a small cell co-channel with one of the macro cells was shown and described. In FIG. 2, a heterogeneous network having a macro cell and a small cell is shown and described. Repetitive description of like elements employed in other embodiments described herein is omitted for sake of brevity.

Turning now to FIG. 2, system 200 can include a cell device 102, which operates on a first carrier frequency (e.g., F1) and at least one small cell device 110, which operates on a second carrier frequency, F2. Small cell device 110 can be deployed at a particular geographic location that has a level of traffic higher than a defined value some embodiments. For example, the small cell device 110 can be configured as a hot spot cell device to service high traffic load. In other embodiments, small cell device 110 can be located at any location and can have a coverage area 108 that overlaps with or is at least partially encompassed by coverage area 104 of cell device 102. In the embodiment shown, small cell device 110 has a coverage area 108 that is encompassed by the coverage area 104.

When the cell device 102 determines that cell device 102 is overloaded or has a traffic load that is greater than or equal to a defined value or for which traffic is growing according to a particular function indicative of impending traffic overload, cell device 102 can begin to offload traffic for one or more of the mobile devices 114, 116, 118 to the small cell device 110, which operates at carrier frequency, F2.

In various embodiments, the cell device 102 can utilize direct or system messaging between the cell device 102 and the small cell device 110 and the profile information for the small cell device 110 to identify the presence of the small cell device 110 and the likely coverage area of the small cell device 110 as described with reference to FIG. 1. In some embodiments, geofencing or cell type reporting (along with speed of movement of the mobile devices in some embodiments) can also be employed to facilitate selection of the preferred mobile devices for re-assignment to the small cell device 110 and/or for selection of mobile devices to exclude from candidacy for re-assignment (based on speed of movement of the mobile devices) as described with reference to FIG. 1.

Figure 3:
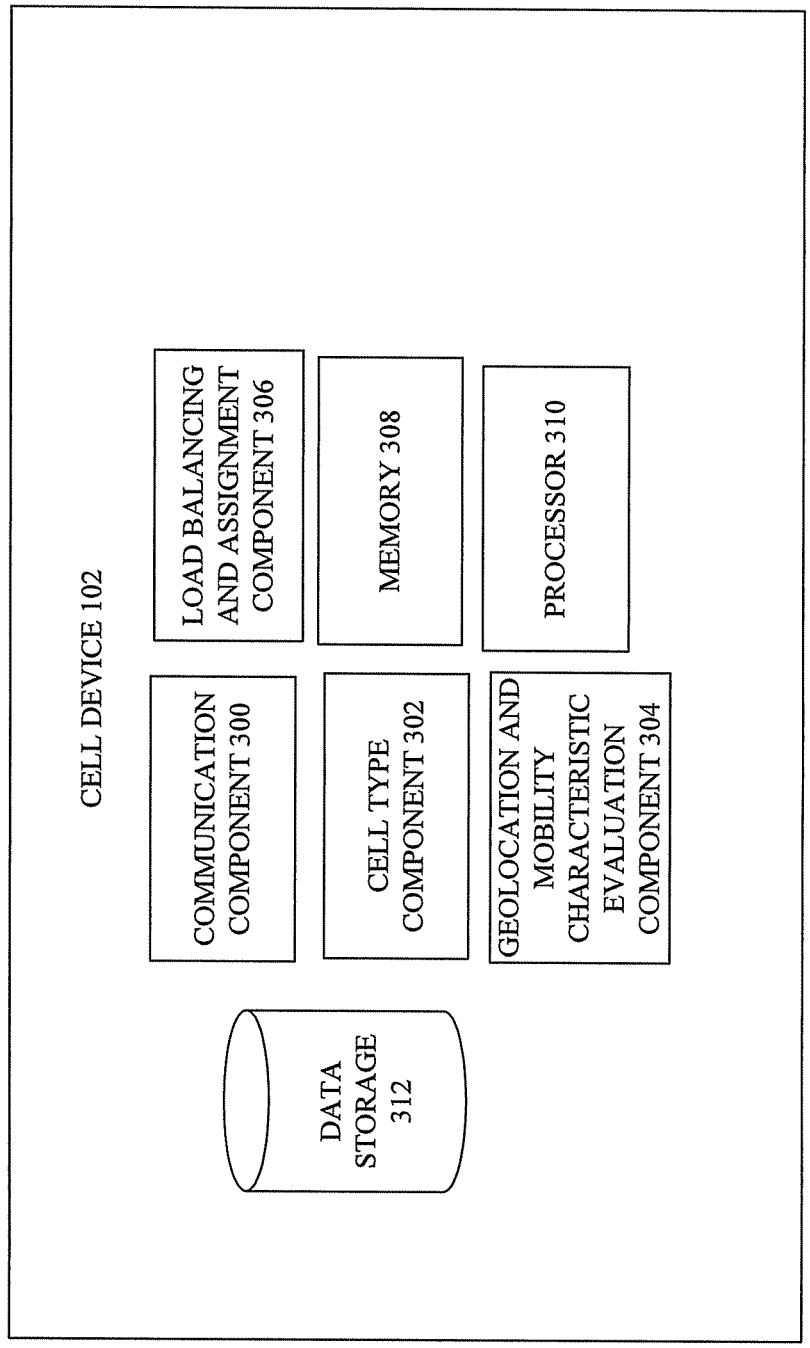
FIG. 3 illustrates an example block diagram of a cell device configured to facilitate load balancing in wireless heterogeneous networks in accordance with one or more embodiments described herein.

FIG. 3 illustrates an example block diagram of a cell device configured to facilitate load balancing in wireless heterogeneous networks in accordance with one or more embodiments described herein. Cell device 102 can include a communication component 300, cell type component 302, geolocation and mobility characteristic evaluation component 304, load balancing and assignment component 306, memory 308, processor 310 and/or data storage 312. In various embodiments, one or more of the communication component 300, cell type component 302, geolocation and mobility characteristic evaluation component 304, load balancing and assignment component 306, memory 308, processor 310 and/or data storage 312 can be electrically and/or communicatively coupled to one another to perform one or more functions of the cell device 102.

The communication component 300 can transmit and/or receive information from the mobile devices in the coverage area of the cell device 102 and/or to the small cell device to which mobile devices can be offloaded from the cell device 102. For example, the communication component 300 can receive information including, but not limited to, notifications from the mobile devices regarding detection of a broadcast cell type identity signal from the small cell device, and direct messages from the small cell device regarding the location of the small cell device. The communication component 300 can transmit information such as information re-assigning a mobile device to the small cell device (or to another cell device).

The cell type component 302 can receive and/or process information indicative of the cell devices (e.g., small cell device, macro cell device) to which the cell device can offload during load balancing.

The geolocation and mobility characteristic evaluation component 304 can receive, process and/or determine the presence of a small cell device or another cell device (embodiments of FIG. 1 or 2) and/or the coverage area of the small cell device or another cell device. The geolocation and mobility characteristic evaluation component 304 can also determine the location of the mobile devices in the coverage area of the cell device (and whether the mobile device is within the coverage area of the small cell device). The geolocation and mobility characteristic evaluation component 304 can also determine speed of movement of the mobile device in some embodiments.

The load balancing and assignment component 306 can determine that load balancing will be performed by the cell device 102.

The load balancing and assignment component 306 can determine or identify a list or set of one or more mobile devices that are candidates for (or preferred for or prioritized for) offloading to the small cell device. For example, the load balancing and assignment component 306 can determine the mobile devices to offload to the small cell device based on determining which mobile devices are within the coverage area of the small cell area and excluding from re-assignment to the small cell device those mobile devices that have a speed of movement greater than a defined speed value. The defined speed value can be changed from time to time in some embodiments.

The memory 308 can be a computer-readable storage medium storing computer-executable instructions and/or information for performing the functions described herein with reference to cell device 102 (or components of cell device 102). For example, memory 308 can store computer-executable instructions that can be executed by processor 310 to determine geolocation of the mobile device, to compare the geolocation of the coverage area of the small cell device with the geolocation of the mobile device, to generate notifications to the mobile device, to process the broadcast cell type identification information, to establish connectivity with a new cell device, a mobile device, to perform load balancing, to exclude mobile devices for offloading based on speed of movement or the like. Processor 310 can perform one or more of the functions described herein with reference to cell device 102 (or a component of the cell device 102). Data storage 312 can be configured to store information accessed by, received by and/or processed by the cell device 102. For example, data storage 312 can store geolocation information for the small cell device/small cell device coverage area, geolocation information for the mobile device 114, speed of movement information, geoloccell device assignment information or the like.

Figure 4:
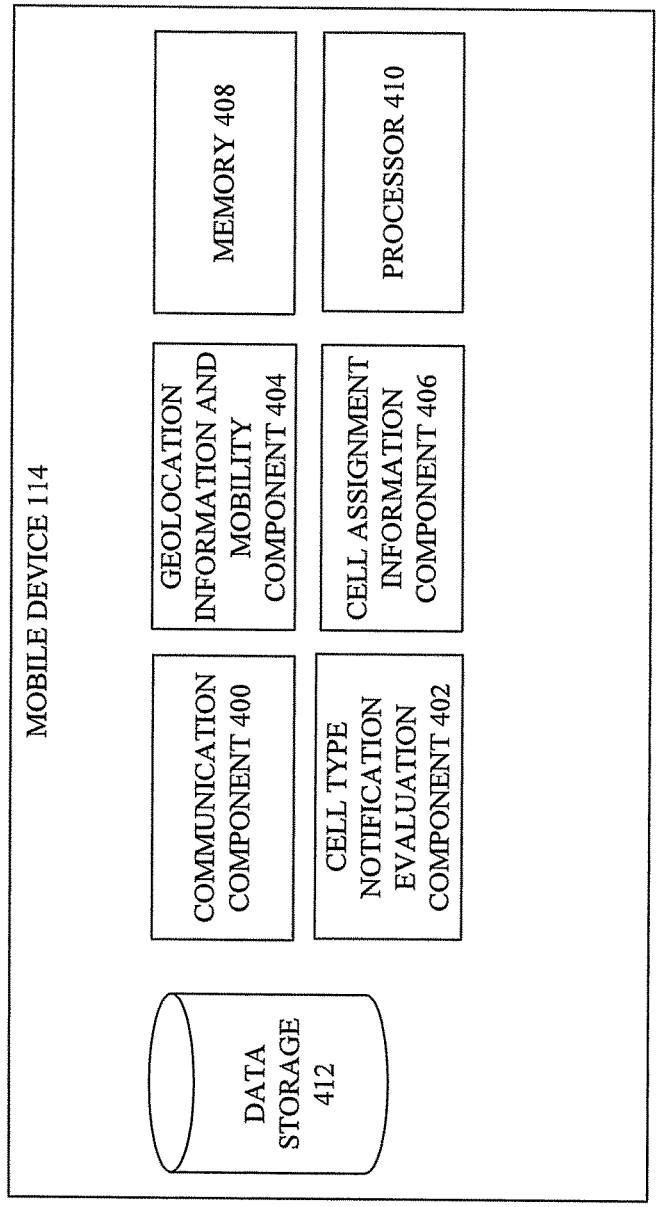
FIG. 4 illustrates an example block diagram of a mobile device configured to facilitate load balancing in wireless heterogeneous networks in accordance with one or more embodiments described herein.

FIG. 4 illustrates an example block diagram of a mobile device configured to facilitate load balancing in wireless heterogeneous networks in accordance with one or more embodiments described herein. Mobile device 114 can include a communication component 400, cell type notification evaluation component 402, geolocation information and mobility component 404, cell assignment information component 406, memory 408, processor 410 and/or data storage 412. In various embodiments, one or more of the communication component 400, cell type notification evaluation component 402, geolocation information and mobility component 404, cell assignment information component 406, memory 408, processor 410 and/or data storage 412 can be electrically and/or communicatively coupled to one another to perform one or more functions of the mobile device 114. While mobile device 114 is described, in various embodiments, one or more of the structure and/or function of the mobile devices 114, 116 can be as described and/or shown with reference to mobile device 114.

The communication component 400 can transmit and/or receive information to and/or from the mobile device 114, small cell device and/or cell device. In various embodiments, the information can include cell type reporting signals broadcast by the small cell device, notification of detection of the cell type reporting signals by the mobile device 114, information re-assigning the mobile device 114 to the small cell device from the cell device or the like.

The cell type notification evaluation component 402 can receive and/or process information from the small cell device indicative of the presence of the small cell device. For example, the mobile device 114 can detect the cell type identification broadcast from the small cell device and transmit the notification (via the communication component 400) to the cell device indicating detection of the broadcast.

The geolocation information and mobility component 404 can process information indicative of the geographical location of the coverage area of the small cell device (e.g., geofencing information or other information indicative of the location of the coverage area of the small cell device or the mobile device). The mobile device 114 can utilize such information (which can be stored at the mobile device 114 upon receipt) to compare with the current location of the mobile device 114 and inform the cell device when the mobile device 114 is located within the coverage area of the small cell device. The geolocation information and mobility component 404 can also generate information indicative of the speed of movement of the mobile device 114. In some embodiments, the mobile device 114 can transmit speed of movement information to the cell device. In other embodiments, the cell device can determine the speed of movement of the mobile device 114.

The cell assignment information component 406 can store and/or process information received at the cell device indicative of a re-assignment to a new cell device (e.g., re-assignment to small cell device) and/or current cell device to which the mobile device 114 is assigned or the like.

The memory 408 can be a computer-readable storage medium storing computer-executable instructions and/or information for performing the functions described herein with reference to mobile device 114 (or components of mobile device 114). For example, memory 408 can store computer-executable instructions that can be executed by processor 410 to determine geolocation of the mobile device, to compare the geolocation of the coverage area of the small cell device with the geolocation of the mobile device, to generate notifications to the cell device, to process the broadcast cell type identification information, to establish connectivity with a new cell device or the like. Processor 410 can perform one or more of the functions described herein with reference to mobile device 114 (or components of mobile device 114) including, but not limited to, processing re-assignment information, detecting and processing broadcast signal information or the like. Data storage 412 can be configured to store information accessed by, received by and/or processed by mobile device 114. For example, data storage 412 can store geolocation information for the small cell device, geolocation information for the mobile device 114, cell device assignment information or the like.

Figure 5:
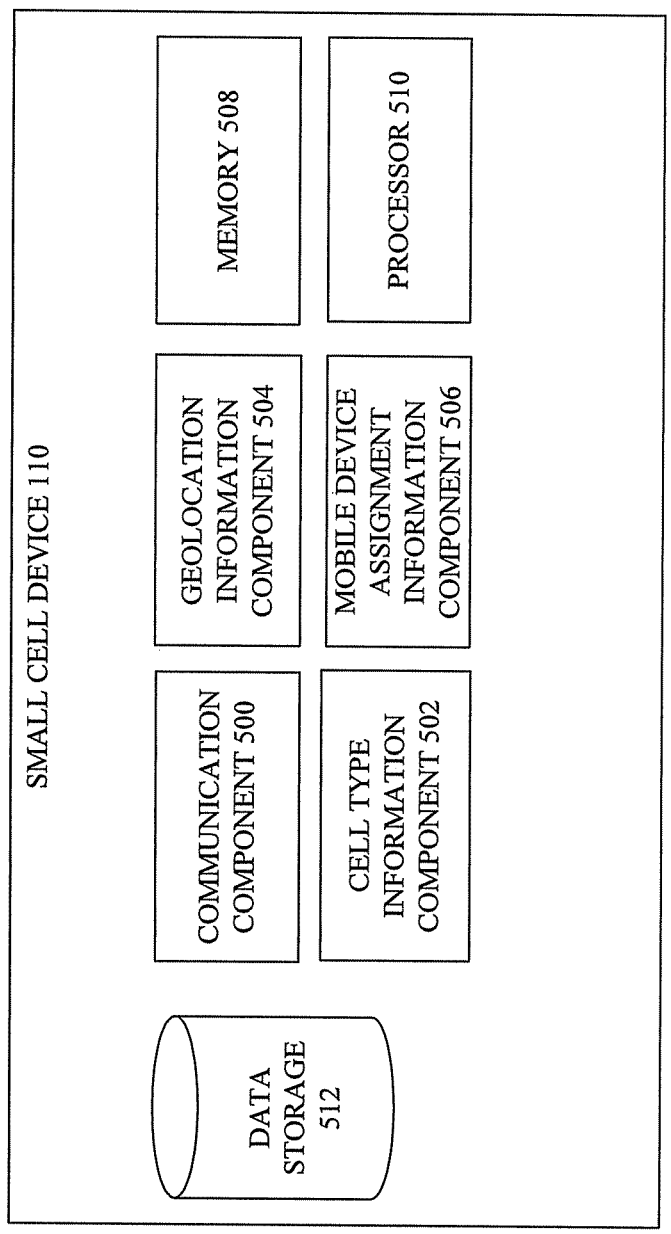
FIG. 5 illustrates an example block diagram of a small cell device configured to facilitate load balancing in wireless heterogeneous networks in accordance with one or more embodiments described herein.

FIG. 5 illustrates an example block diagram of a small cell device configured to facilitate load balancing in wireless heterogeneous networks in accordance with one or more embodiments described herein. The small cell device 110 can include a communication component 500 that can transmit and/or receive information (e.g., cell type broadcast information, geolocation information, mobile device assignment information), cell type information component 502 that can broadcast cell type identification information to the mobile devices or the cell device, a geolocation information component 504 that can determine and/or process small cell device location and/or coverage area information, mobile device assignment information component 506 that can store and/or process mobile devices assigned to the small cell device, memory 508 that can store computer-executable instructions that can be executed by processor 510 to broadcast cell type information, service a mobile device assigned to the memory or the like, and a data storage 512 configured to store information accessed by, received by and/or processed by the small cell device 110 such as store geolocation information for the small cell device, cell device assignment information or the like.

Figure 6:
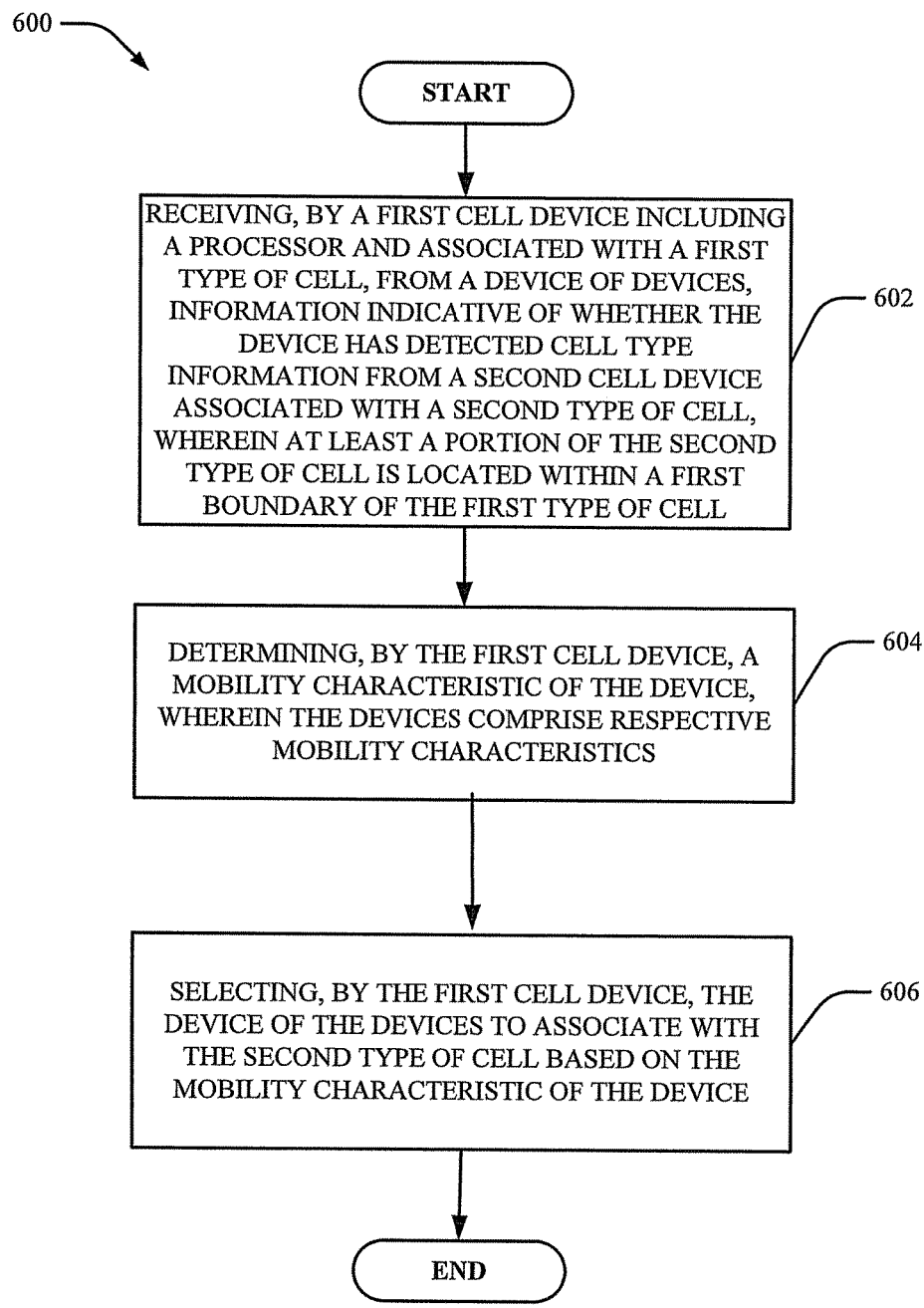
FIGS. 6-9 illustrate example flowcharts of methods that facilitate load balancing in wireless heterogeneous networks in accordance with one or more embodiments described herein.

FIGS. 6-9 illustrate example flowcharts of methods that facilitate load balancing in accordance with one or more embodiments described herein. Turning first to FIG. 6, at 602, method 600 can include receiving, by a first cell device including a processor and associated with a first cell, from a device of devices, information indicative of whether the device has detected cell type information from a second cell device associated with a second cell, wherein at least a portion of the second cell is located within a first boundary of the first cell.

In some embodiments, the information indicative of whether the device has detected cell type information includes information indicative of whether the device is located within the second boundary of the second cell. The association of the one or more devices of the devices with the second cell device can include offloading of the one or more devices from the first cell device to the second cell device.

At 604, method 600 can include determining, by the first cell device, a mobility characteristic of the device, wherein the devices comprise respective mobility characteristics. For example, the mobility characteristic can be the speed of movement of the device in some embodiments.

At 606, method 600 can include selecting, by the first cell device, the device of the devices to associate with the second cell based on the mobility characteristic of the device. In some embodiments, selecting also includes excluding, by the first cell device, for selection for association with the second cell, devices having a mobility characteristic indicative of a speed greater than a defined value. In some embodiments, selecting is also based on a determination that the device is located within a second boundary of the second cell. In some embodiments, selecting includes prioritizing, by the first cell device, as having a higher rank, the devices having respective mobility characteristics indicative of a speed below a defined value.

Figure 7:
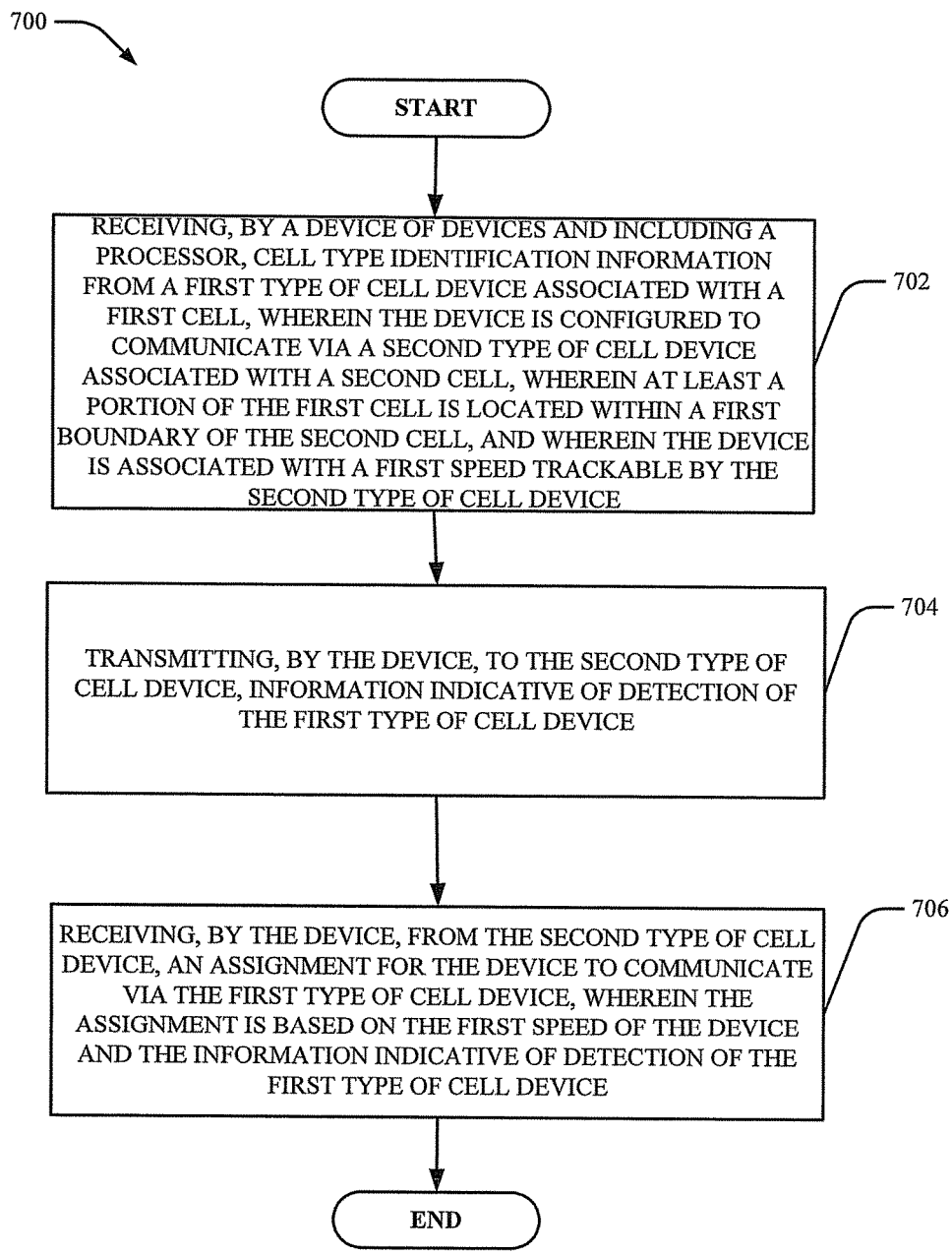

Turning now to FIG. 7, at 702, method 700 can include receiving, by a device of devices and including a processor, cell type identification information from a first cell device associated with a first cell, wherein the device is configured to communicate via a second cell device associated with a second cell, wherein at least a portion of the first cell is located within a first boundary of the second cell, and wherein the device is associated with a first speed trackable by the second cell device. At 704, method 700 can include transmitting, by the device, to the second cell device, information indicative of detection of the first cell device. At 704, method 700 can include receiving, by the device, from the second cell device, an assignment for the device to communicate via the first cell device, wherein the assignment is based on the first speed of the device and the information indicative of detection of the first cell device. In some embodiments, although not shown, method 700 can also include ceasing communication with the second cell device and initiating communication via the first cell device based on the receiving the assignment.

Figure 8:
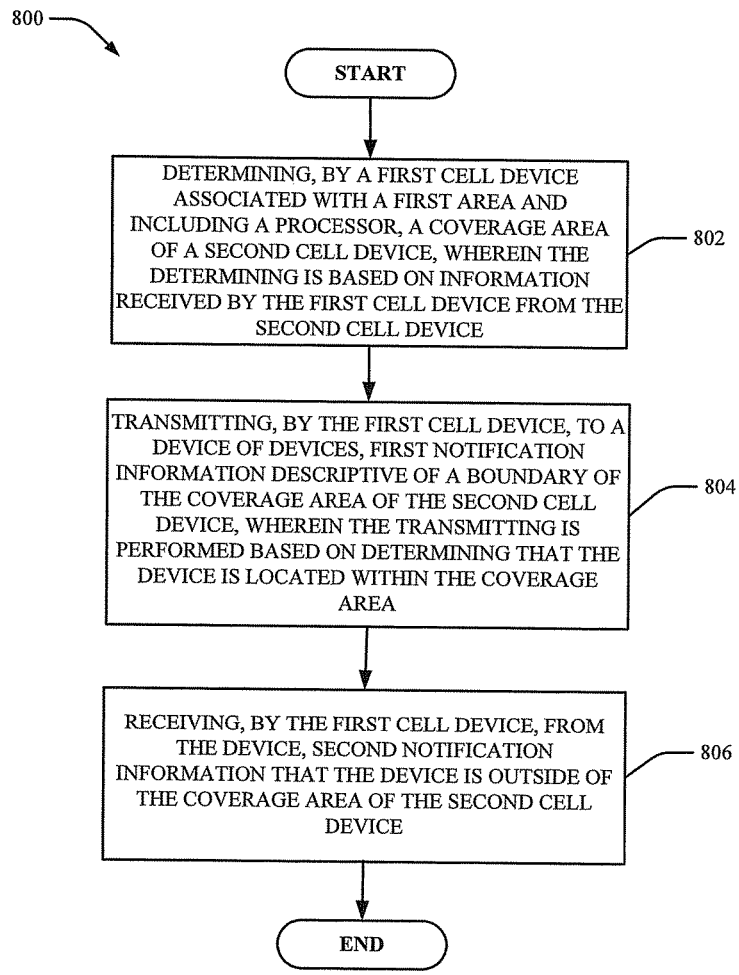

Turning now to FIG. 8, at 802, method 800 can include determining, by a first cell device associated with a first area and including a processor, a coverage area of a second cell device, wherein the determining is based on information received by the first cell device from the second cell device. In various embodiments, the information includes geolocation information for the second cell device and/or information for the second cell device. The profile information can include transmit power for the second cell device and/or the capacity for the second cell device.

At 804, method 800 can include transmitting, by the first cell device, to a device of devices, first notification information descriptive of a boundary of the coverage area of the second cell device, wherein the transmitting is performed based on determining that the device is located within the coverage area. In some embodiments, the transmitting the first notification information is performed via a radio resource control reconfiguration message.

At 806, method 800 can include receiving, by the first cell device, from the device, second notification information that the device is outside of the coverage area of the second cell device. The second notification includes a radio access network identifier.

Although not shown, in some embodiments, the method also includes receiving, by the first cell device, notification that a device is located within the coverage area of the second cell device. Although also not shown, in some embodiments, the method also includes determining, by the first cell device, devices located within the coverage area of the second cell device.

Figure 9:
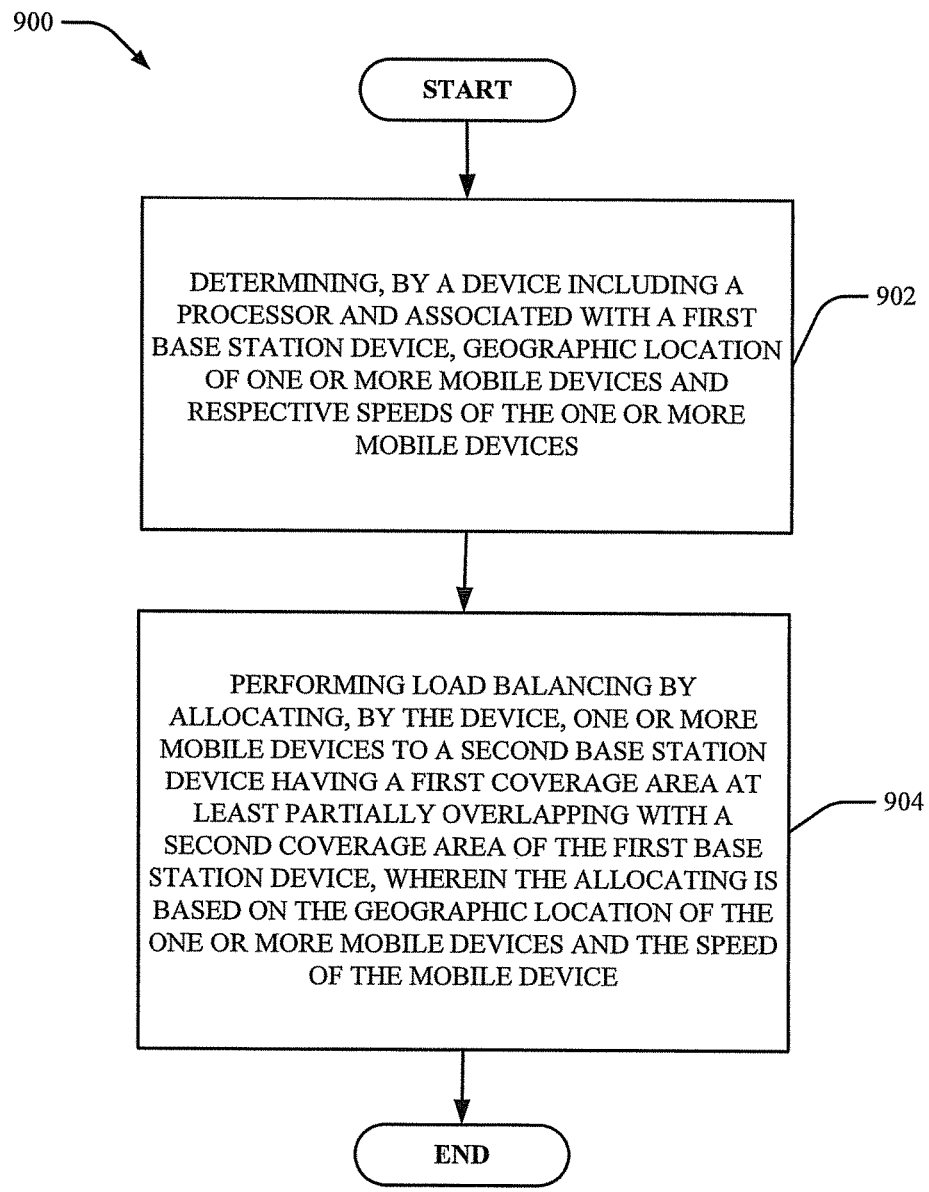

Turning now to FIG. 9, at 902, method 900 can include determining, by a device including a processor and associated with a first cell device, geographic location of one or more mobile devices and respective speeds of the one or more mobile devices. At 904, method 900 can include performing load balancing by allocating, by the device, one or more mobile devices to a second cell device having a first coverage area at least partially overlapping with a second coverage area of the first cell device, wherein the allocating is based on the geographic location of the one or more mobile devices and the speed of the mobile device.

Figure 10:
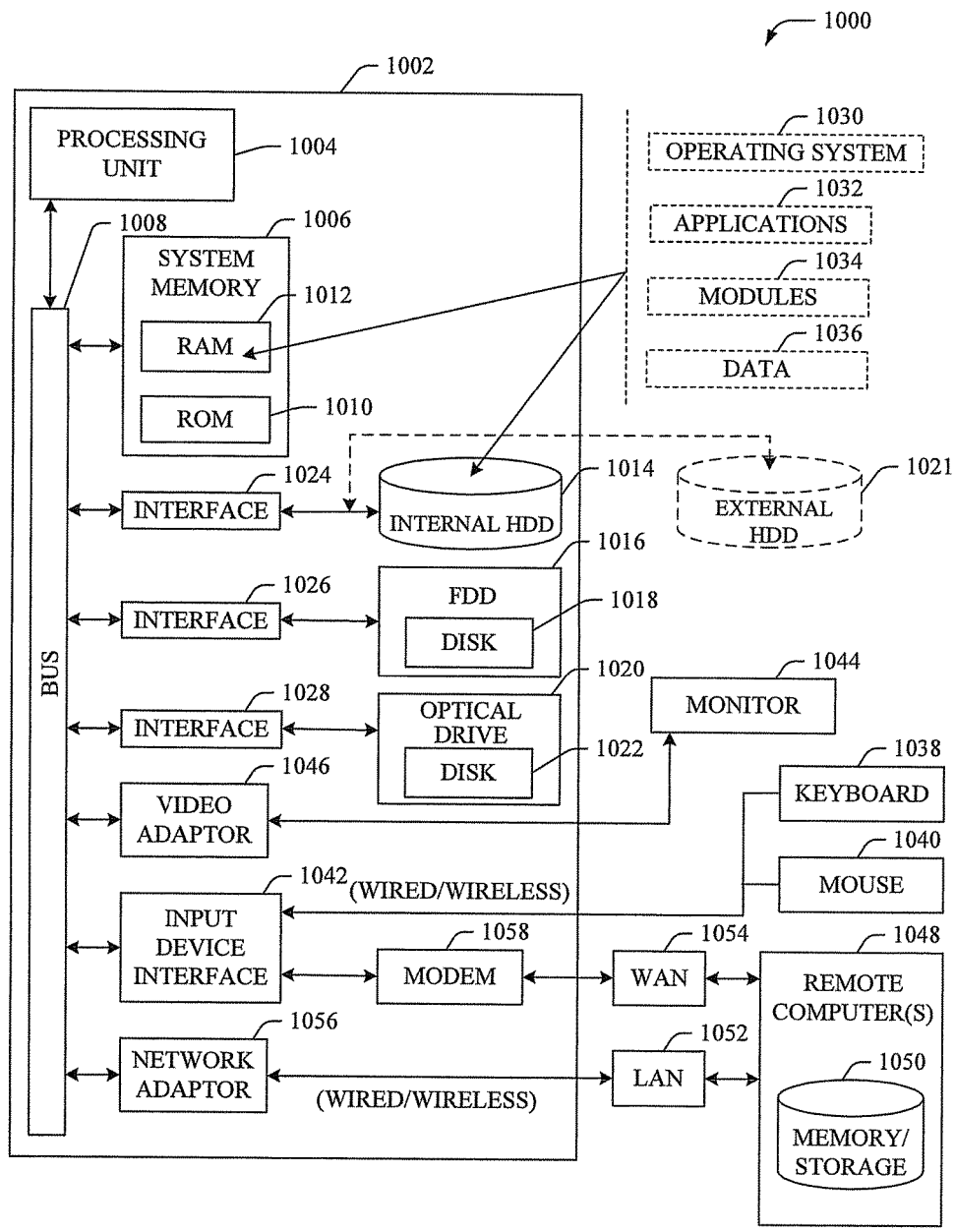
FIG. 10 illustrates a block diagram of a computer operable to facilitate load balancing in wireless heterogeneous networks accordance with one or more embodiments described herein.

FIG. 10 illustrates a block diagram of a computer operable to facilitate load balancing in accordance with one or more embodiments described herein. For example, in some embodiments, the computer can be or be included within cell device 102, 106, mobile devices 114, 116, 118, or small cell device 110 (or components of cell device 102, 106, mobile devices 114, 116, 118, or small cell device 110).

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Tangible and/or non-transitory computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage, other magnetic storage devices and/or other media that can be used to store desired information. Computer-readable storage media can be accessed by one or more local or remote computing devices, e.g., via access requests, queries or other data retrieval protocols, for a variety of operations with respect to the information stored by the medium.

In this regard, the term "tangible" herein as applied to storage, memory or computer-readable media, is to be understood to exclude only propagating intangible signals per se as a modifier and does not relinquish coverage of all standard storage, memory or computer-readable media that are not only propagating intangible signals per se.

In this regard, the term "non-transitory" herein as applied to storage, memory or computer-readable media, is to be understood to exclude only propagating transitory signals per se as a modifier and does not relinquish coverage of all standard storage, memory or computer-readable media that are not only propagating transitory signals per se.

Communications media typically embody computer-readable instructions, data structures, program modules or other structured or unstructured data in a data signal such as a modulated data signal, e.g., a channel wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller device), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). In some embodiments, computer 1002 can include external HDD 1021. The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A mobile device can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies.

Thus, the communication can be a defined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a femto cell device. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 Base T wired Ethernet networks used in many offices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of an acquired network. A classifier is a function that maps an input attribute vector, x=(x1, x2, x3, x4, . . . , xn), to a confidence that the input belongs to a class, that is, f(x)=confidence(class). Such classification can employ a probabilistic and/or statistical-based analysis (e.g., factoring into the analysis utilities and costs) to prognose or infer an action that a mobile device desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing mobile device behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller device (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of mobile device equipment. A processor can also be implemented as a combination of computing processing units.

As used herein, terms such as "data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. The values and units of time provided herein are mere examples and any number of different values and units of time can be employed. All such variations are envisaged. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   receiving, by a first cell device comprising a processor and associated with a first cell, from a device of devices, first information indicative of whether the device has detected cell type information from a second cell device associated with a second cell, wherein the first information was determined based on a result of determining whether an overlap exists between geofencing information of the second cell device and a first location of the device of the devices, wherein at least a portion of the second cell is located within a first boundary of the first cell, and wherein the first cell is of a first cell type and the second cell is of a second cell type;

determining, by the first cell device, a mobility characteristic of the device of the devices, wherein the devices comprise respective mobility characteristics;

selecting, by the first cell device, the device of the devices to associate with the second cell based on the mobility characteristic of the device of the devices, wherein the selecting comprises: prioritizing, by the first cell device, as having a higher rank, ones of the devices having characteristics of the respective mobility characteristics indicative of a speed below a defined value;

transmitting, by the first cell device, second information identifying a size of a coverage area for the second cell device, wherein the first cell device does not comprise first knowledge of an identity of the second cell device, and wherein the first cell device comprises second knowledge of a geographical location of the second cell device; and performing, by the first cell device, offloading based on a second location of the first cell device, a third location of the second cell device with regard to the first location of the device and the speed of the device.

2. The method of claim 1, wherein the selecting is further based on a determination that the device of devices is located within a second boundary of the second cell.

3. The method of claim 2, wherein the mobility characteristic of the device of devices comprises a movement of the device of devices being at the speed below the defined value.

4. The method of claim 2, wherein the first information indicative of whether the device of devices has detected cell type information comprises the first information indicative of whether the device of devices is located within the second boundary of the second cell.

5. The method of claim 1, wherein the selecting further comprises:
excluding, by the first cell device, for selection for association with the second cell, other ones of the devices having characteristics of the respective mobility characteristics indicative of a speed greater than the defined value.

6. The method of claim 1, wherein the first cell comprises a macro cell and the second cell comprises a femto cell.

7. A method, comprising:
receiving, by a device of devices and comprising a processor, cell type identification information from a first cell device associated with a first cell, wherein the device is configured to communicate via a second cell device associated with a second cell, wherein at least a portion of the first cell is located within a first boundary of the second cell, and wherein the device is associated with a first speed trackable by the second cell device;
transmitting, by the device, to the second cell device, first information indicative of detection of the first cell device;
transmitting, by the device, to the second cell device, a speed of movement of the device;
receiving, by the device, from the second cell device, an assignment for the device to communicate via the first cell device, wherein the assignment is based on the speed of movement of the device a first location of the first cell device and a second location of the second cell device; and
receiving, by the device, from the second cell device, notification information descriptive of a boundary and a size of a coverage area of the first cell device, wherein the second cell device does not know a specific identity of the first cell device, and wherein the second cell device knows second information indicating the size of the coverage area of the first cell device.

8. The method of claim 7, further comprising ceasing, by the device, communication with the second cell device and initiating, by the device, communication via the first cell device based on the receiving the assignment.

9. A non-transitory machine-readable storage medium, comprising executable instructions that, when executed by a processor of a first cell device, facilitate performance of operations, comprising:
determining, by the first cell device associated with a first area, a coverage area of a second cell device via a query of an operating support system, wherein the determining is based on first information received by the first cell device from the second cell device, wherein a boundary of the coverage area is based on a determination of a radius of the coverage area, and wherein the determination of the radius is based on a transmit power of the second cell device;
transmitting, by the first cell device, to a device of devices, first notification information descriptive of the boundary and a geographical location of the coverage area of the second cell device, wherein the first cell device does not obtain a specific identity of the second cell device, wherein the first cell device knows second information indicating the geographical location of the coverage area of the second cell device, and wherein the transmitting is performed based on determining that the device of the devices is located within the coverage area;
receiving, by the first cell device, from the device of the devices, second notification information that the device of the devices is outside of the coverage area of the second cell device; and
performing, by the first cell device, offloading based on a first location of the first cell device, a second location of the second cell device with regard to a third location of the device and a speed of the device.

10. The non-transitory machine-readable storage medium of claim 9, wherein the operations further comprise:
receiving, by the first cell device, a notification that the device of the devices is located within the coverage area of the second cell device.

11. The non-transitory machine-readable storage medium of claim 9, wherein the operations further comprise:
determining, by the first cell device, a subset of the devices is located within the coverage area of the second cell device.

12. The non-transitory machine-readable storage medium of claim 9, wherein the first information comprises geolocation information for the second cell device.

13. The non-transitory machine-readable storage medium of claim 9, wherein the first information comprises profile information for the second cell device.

14. The non-transitory machine-readable storage medium of claim 13, wherein the profile information comprises a transmit power for the second cell device.

15. The non-transitory machine-readable storage medium of claim 13, wherein the profile information comprises information indicative of a capacity of the second cell device.

16. The non-transitory machine-readable storage medium of claim 9, wherein the second notification information comprises a radio access network identifier.

17. The non-transitory machine-readable storage medium of claim 9, wherein the transmitting the first notification information is performed via a radio resource control reconfiguration message.

18. The non-transitory machine-readable storage medium of claim 11, wherein the operations further comprise:
   prioritizing, by the first cell device, for re-assignment to the second cell device, the subset of the devices located within the coverage area of the second cell device.

19. The non-transitory machine-readable storage medium of claim 18, wherein the operations further comprise:
   generating, by the first cell device, a notification of re-assignment of prioritized devices to the second cell device.

20. The non-transitory machine-readable storage medium of claim 18, wherein the prioritizing, by the first cell device, for the re-assignment to the second cell device, the subset of the devices located within the coverage area of the second cell device is further based on the subset of the devices being determined to have a speed of movement less than a defined value.

* * * * *